Patented Nov. 11, 1941

2,262,464

UNITED STATES PATENT OFFICE 2,262,464

PRODUCTION OF NEW AZO DYESTUFFS ON CELLULOSE MATERIALS

Geoffrey Jones Marriott and Kenneth Herbert Saunders, Blackley, Manchester, England, assignors to Imperial Chemical Industries Limited, a corporation of Great Britain No Drawing. Application December 21, 1939, Serial No. 310,440. In Great Britain January 3, 1939

18 Claims. (Cl. 8—46)

The present invention relates to the manufacture of new compounds and their application in the colouring of cellulosic material. More particularly this invention relates to making new arylamides of 2:3-hydroxynaphthoic acid and to the colouring of cellulosic material by causing the said 2:3-hydroxynaphthoic amides to couple on the fibre with diazotised aromatic amines.

It is an object of this invention to produce advantageous results in the colouring and printing of cellulosic textile material. A further object is to provide new chemical compounds which are useful in the art of colouring cellulosic textile material. Another object is to provide a method for preparing such new chemical compounds. Still another object is to provide new compositions of matter and to advance the art. Other objects will appear hereinafter.

According to the invention amines which are 4 - amino - 2:5-di($\beta$-acetoxyethoxy)-anilides of benzoic acid and phenoxyacetic acids, which acids may carry as nuclear substituents, for example, alkoxy or halogen, are condensed with 2:3-hydroxynaphthoic acid or a reactive derivative thereof, and hydrolysed so as to produce the new corresponding 2:3-hydroxynaphthoic-2':5'-di($\beta$-hydroxyethoxy)-anilides which are reactive towards diazo compounds.

Thus there may be employed, in accordance with the invention, 4-amino-2:5-di($\beta$-acetoxyethoxy) anilides of, for example, the following acids, benzoic acid, o-chlorobenzoic acid, m-bromobenzoic acid, p-methoxybenzoic acid, and phenoxyacetic acid.

By a further feature of the invention the said 2:3-hydroxynaphthoic anilides are applied to cellulosic fibre and the material coloured by the application thereto of a diazo compound, which is free of solubilising groups such as sulphonic acid or carboxylic acid groups. The diazo compound may be applied in stabilised form, e. g. in the form of a metallic double salt or an arylsulphonate with or without other metallic salts.

For the purpose of providing diazo components there may be employed, for example, the following amines: o-chloroaniline, m-chloroaniline, o-nitroaniline, 2:5 - dichloroaniline, 4 - nitro - 2 - aminotoluene, 5-nitro-2-aminotoluene, 4-nitro-2-aminoanisole, 5 - chloro - 2 - aminotoluene, 4-chloro-2-nitroaniline, 3-nitro-4-aminotoluene, 4-chloro-2-aminoanisole, $\alpha$-aminoanthraquinone, 5-nitro-2-aminoanisole, 3-nitro-4-aminoanisole, 2-chloro-4-benzoylamino-5-methoxyaniline, and 4-benzoylamino-2:5-diethoxyaniline.

In this way, orange, red, brown and maroon shades are obtained of surprisingly good light fastness. Also the 2:3-hydroxynaphthoic-2':5'-di($\beta$-hydroxyethoxy)-anilides described above, which are used as coupling components, possess only small to medium affinity for the fibre. This is an advantage when they are used by textile printers since the uncoloured portions of the printed fabric can be easily washed to give a clear white. Moreover the shades obtained are capable of being discharged to a good clear white.

The 4-a m i n o - 2:5 - di - ($\beta$-acetoxyethoxy)-anilides referred to above, can be made by interacting 2:5-di($\beta$-acetoxyethoxy) aniline with the requisite carboxylic acid halide, and then nitrating and reducing. 2:5-di($\beta$-acetoxyethoxy) aniline can be made as described in British specification No. 422,417.

The invention is illustrated but not limited by the following examples, in which the parts are by weight.

Example 1

21 parts of 4-benzoylamino-2:5-di($\beta$-acetoxyethoxy) aniline, which may be made as described below, are heated with stirring in 175 parts of toluene at 60° C., together with 9.5 parts of 2:3-hydroxynaphthoic acid, and 2.7 parts of phosphorus trichloride are added drop by drop during one hour. The mixture is then boiled under reflux for 15 hours, poured into water and the aqueous layer made alkaline with sodium carbonate and the toluene removed by steam distillation. The insoluble material is filtered off, washed and dissolved in a boiling solution of 10 parts of sodium hydroxide in 600 parts of water. The solution so obtained is cooled, filtered and the new amide, of constitution 2:3-hydroxynaphthoic - 2':5' - di($\beta$-hydroxyethoxy)-4'-benzoylamino anilide, precipitated by the addition of acid, filtered off and dried.

4-benzoylamino-2:5-di($\beta$-acetoxyethoxy) aniline (M. P. 110° C.) may be made by condensing benzoyl chloride with 2:5-di($\beta$-acetoxyethoxy) aniline in benzene in the presence of potassium acetate followed by nitration in glacial acetic acid and reduction of the resulting benzoyl compound.

Example 2

5 parts of the new amide made according to Example 1 are made into a paste with 10 parts of 50% Turkey red oil, which has been neutralised with sodium carbonate, and 100 parts of boiling water are added followed by 10 parts of sodium hydroxide solution (S. G. 1.31). The resulting solution is diluted with 775 parts of cold water and 50 parts of cotton yarn are immersed therein for 20 minutes, removed, squeezed well and then introduced into a bath containing 2 parts of diazotised p-chloro-o-nitroaniline per 1000 parts of solution. The cotton is turned for 20 minutes in the bath, removed, squeezed, rinsed well in cold water and boiled for 20 minutes in a solution containing 2 parts of sodium carbonate and 3 parts of neutral soap flakes per 1000 parts of solution. A dull reddish-brown shade of good light fastness is obtained.

By replacing p-chloro-o-nitroaniline by the undermentioned amine, for example, the following shades having good fastness properties may be obtained:

| Amine employed | Shade obtained |
| --- | --- |
| m-Chloroaniline | Brownish red. |
| 2:5-dichloroaniline | Orange brown. |
| α-aminoanthraquinone | Brown. |
| 5-chloro-2-aminotoluene | Dull red. |
| 5-nitro-2-aminoanisole | Dull maroon. |
| 4-nitro-2-aminoanisole | Dull red. |

*Example 3*

20 parts of 4-(phenoxyacetylamino)-2:5-di($\beta$-acetoxyethoxy) aniline, which may be made as described below, are heated to 80° C., with stirring in 300 parts of toluene together with 10 parts of 2:3-hydroxynaphthoic acid whilst 2.5 parts of phosphorus trichloride are added dropwise during 20 minutes. The mixture is then boiled under reflux for 16 hours and the toluene removed and the new amide of constitution 2:3-hydroxynaphthoic-2':5'- di ($\beta$ - hydroxyethoxy)-4'-phenoxyacetylamino anilide prepared as described in Example 1.

4-(phenoxyacetylamino)-2:5-di($\beta$-acetoxyethoxy)-aniline (M. P. 109° C.) may be made by condensing phenoxyacetyl chloride with 2:5-di($\beta$-acetoxyethoxy)-aniline in benzene in the presence of sodium acetate followed by nitration in glacial acetic acid and reduction of the resulting phenoxy-acetyl compound.

*Example 4*

3 parts of the new amide made according to Example 3 are made into a paste with 10 parts of 50% Turkey red oil, which has been neutralised with sodium carbonate, and 60 parts of boiling water are added followed by 6 parts of sodium hydroxide solution (S. G. 1.31). Boiling is continued until a clear solution is obtained which is then diluted with 920 parts of cold water. 50 parts of cotton yarn are immersed in this solution for 20 minutes and treated with a solution containing 2 parts of diazotised p-chloro-o-nitroaniline per 1000 parts of solution in the manner described in Example 2. A dull reddish-brown shade of good light fastness is obtained.

There may be employed in place of p-chloro-o-nitroaniline, for example, the amines which are indicated below together with the shades obtained thereby.

| Amine employed | Shade obtained |
| --- | --- |
| o-Nitroaniline | Orange brown. |
| 2:5-dichloroaniline | Brownish red. |
| α-aminoanthraquinone | Orange brown. |
| 5-chloro-2-aminotoluene | Red. |
| 5-nitro-2-aminoanisole | Dull red. |
| 4-nitro-2-aminoanisole | Red. |

*Example 5*

22.3 parts of 4'-p-anisoylamino-2:5-di($\beta$-acetoxyethoxy) aniline, which may be made as described below, are heated with stirring in 300 parts of toluene at 60° C. together with 9.5 parts of 2:3-hydroxynaphthoic acid, and 2.7 parts of phosphorus trichloride are added drop by drop during one hour. The mixture is then boiled under reflux for 15 hours, poured into water and the aqueous layer made alkaline with sodium carbonate and the toluene removed by steam distillation. The insoluble material is filtered off, washed and dissolved in a boiling solution of 10 parts of sodium hydroxide in 600 parts of water. The solution so obtained is cooled, filtered and the new amide of constitution 2:3-hydroxynaphthoic-2':5'- di ($\beta$ - hydroxyethoxy)-4'-p-anisoylamino anilide, M. P. 230° C., precipitated by the addition of acid, filtered off and dried.

4-p-anisoylamino-2:5-di($\beta$-acetoxyethoxy) aniline (M. P. 127–128° C.) may be made by condensing p-anisoyl chloride with 2:5-di($\beta$-acetoxyethoxy) aniline in benzene in the presence of potassium acetate, followed by nitration in glacial acetic acid and reduction of the resulting p-anisoyl compound.

*Example 6*

White cotton cloth is padded in a solution of 15 parts of the new amide made according to Example 5, 25 parts of 50% Turkey red oil, which has been neutralised with sodium carbonate, and 20 parts of sodium hydroxide solution (S. G. 1.31) in 940 parts of water. The cloth is then printed with a printing paste containing:

| | Parts |
| --- | --- |
| Zinc chloride double salt of anthraquinone-1-diazonium chloride | 2 |
| 12% mucilage of wheat starch-tragacanth (6:1) | 60 |
| 40% acetic acid | 2 |
| Water | 36 |
| | 100 |

The cloth is dried, immersed for half a minute in a solution containing 10 parts of sodium bisulphite solution (S. G. 1.34) per 1000 parts at 60° C., rinsed well in cold water and boiled for 10 minutes in a solution containing 2 parts of sodium carbonate and 3 parts of neutral soap flakes per 1000 parts of solution. The material is then rinsed in cold water and dried. A reddish-brown print of good fastness properties is obtained.

*Example 7*

24.7 parts of 4-m-bromobenzoylamino-2:5-di($\beta$-acetoxyethoxy) aniline, which may be made as described below, are heated with stirring in 300 parts of toluene at 60° C. together with 9.5 parts of 2:3-hydroxynaphthoic acid, and 2.7 parts of phosphorus trichloride are added drop by drop during one hour. The mixture is then boiled under reflux for 15 hours, poured into water and the aqueous layer made alkaline with sodium carbonate and the toluene removed by steam distillation. The insoluble material is filtered off, washed and dissolved in a boiling solution of 10 parts of sodium hydroxide in 1000 parts of water. The solution so obtained is cooled, filtered and the new amide of constitution 2:3-hydroxynaphthoic-2':5'- di ($\beta$ - hydroxyethoxy)-4'-m-bromobenzoylamino anilide precipitated by the addition of acid, filtered off and dried.

4-m-bromobenzoylamino-2:5-di($\beta$-acetoxyethoxy) aniline (M. P. 103–104° C.) may be made by condensing m-bromobenzoylchloride with 2:5- di(β-acetoxyethoxy) aniline in benzene in the presence of potassium acetate, followed by nitration in glacial acetic acid and reduction of the resulting m-bromobenzoyl compound.

*Example 8*

3 parts of the new amide made according to Example 7 are made into a paste with 10 parts of 50% Turkey red oil, which has been neutralised with sodium carbonate and 60 parts of boiling water are added followed by 6 parts of sodium hydroxide solution (S. G. 1.31). The resulting solution is diluted with 1000 parts of water containing 10 parts of sodium chloride and 50 parts of cotton yarn are immersed therein for 20 minutes, removed, squeezed well and then introduced into a bath containing 2 parts of diazotised 5-nitro-2-aminoanisole per 1000 parts of solution. The cotton is turned for 20 minutes in the bath, removed, squeezed, rinsed well in cold water and boiled for 20 minutes in a solution containing 2 parts of sodium carbonate and 3 parts of neutral soap flakes per 1000 parts of solution. A bluish-red shade of good light fastness is obtained.

When 4-chloro-2-aminoanisole, 4-chloro-2-nitro-aniline, or α-aminoanthraquinone is used instead of 5-nitro-2-aminoanisole, the following shades are obtained:

| Amine employed | Shade obtained |
| --- | --- |
| 4-chloro-2-aminoanisole | Dull red. |
| 4-chloro-2-nitroaniline | Brownish orange. |
| α-aminoanthraquinone | Do. |

As many apparently widely different embodiments of this invention may be made without departing from the spirit and scope thereof, it is to be understood that we do not limit ourselves to the specific embodiments thereof except as defined in the appended claims:

We claim:

1. The compounds represented by the formula

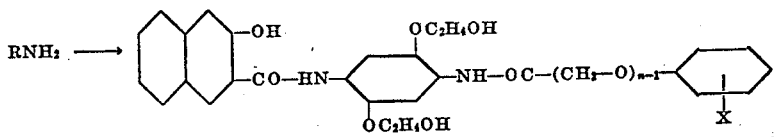

in which X is one of a group consisting of hydrogen, alkoxy and halogen, $n$ is an integer not greater than 2 and R is the radical of a diazotizable aromatic amine which is devoid of solubilizing groups.

2. A compound represented by the formula

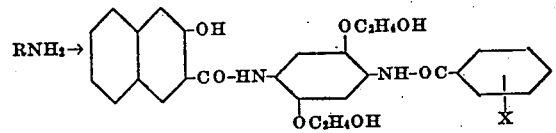

in which X is one of a group consisting of hydrogen, alkoxy and halogen, and R is the radical of a diazotizable aromatic amine which is devoid of solubilizing groups.

3. The compounds represented by the formula

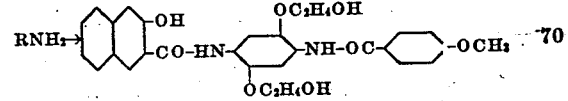

in which R is the radical of a diazotizable aromatic amine which is devoid of solubilizing groups.

4. The compounds represented by the formula

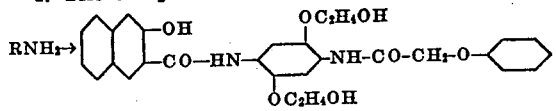

in which R is the radical of a diazotizable aromatic amine which is devoid of solubilizing groups.

5. The compound represented by the formula

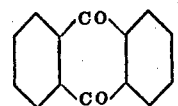
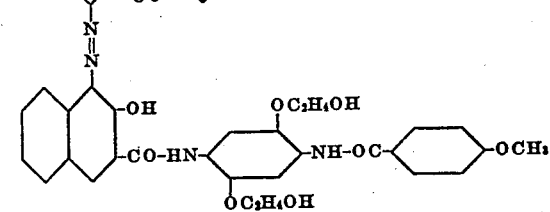

6. The compound represented by the formula

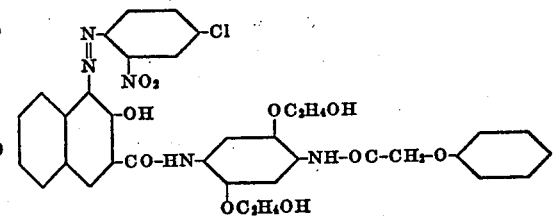

7. The compound represented by the formula

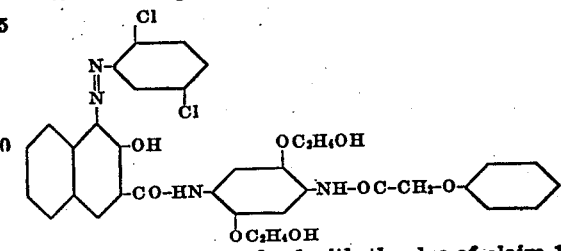

8. Cellulosic fiber dyed with the dye of claim 1.
9. Cellulosic fiber dyed with the dye of claim 2.
10. Cellulosic fiber dyed with the dye of claim 3.
11. Cellulosic fiber dyed with the dye of claim 4.
12. Cellulosic fiber dyed with the dye of claim 5.
13. Cellulosic fiber dyed with the dye of claim 6.
14. Cellulosic fiber dyed with the dye of claim 7.
15. The process which comprises applying to cellulosic fiber an anilide represented by the formula

in which X is one of a group consisting of hydrogen, alkoxy and halogen and $n$ is an integer not greater than 2; and then coupling on the fiber with the diazo of an aromatic amine which is devoid of solubilizing groups.

16. The process in accordance with claim 15 in which the diazo of the aromatic amine is applied in the form of a solution of the diazotized amine.

17. The process in accordance with claim 15 in which the diazo of the aromatic amine is applied in the form of a solution of a stabilized compound of the diazotized amine.

18. Process comprising applying to cellulosic fibre a p'-acylated, 2:3-hydroxynaphthoic-2:5'-di($\beta$-hydroxyethoxy) anilide, in which the acyl group is the residue of an acid of the group consisting of benzoic acid, phenoxy-acetic acid and the nuclearly substituted alkoxy and halogen derivatives of said acids, and colouring the material by the application thereto of a diazo compound which is free of solubilising groups such as sulphonic acid or carboxylic acid groups.

GEOFFREY J. MARRIOTT.
KENNETH HERBERT SAUNDERS.

Certificate of Correction

Patent No. 2,262,464.   November 11, 1941.

GEOFFREY JONES MARRIOTT ET AL.

It is hereby certified that errors appear in the printed specification of the above numbered patent requiring correction as follows: Page 3, second column, lines 66 to 70 inclusive, claim 15, strike out the formula and insert instead the following—

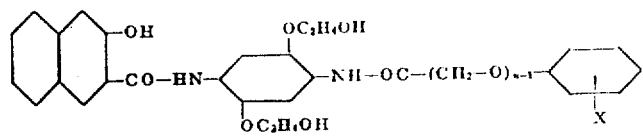

page 4, first column, line 10, claim 18, for "-2:5'-" read -2':5'-; and that the said Letters Patent should be read with these corrections therein that the same may conform to the record of the case in the Patent Office.

Signed and sealed this 30th day of December, A. D. 1941.

[SEAL]

HENRY VAN ARSDALE,
*Acting Commissioner of Patents.*